(12) United States Patent
You et al.

(10) Patent No.: US 7,760,265 B2
(45) Date of Patent: Jul. 20, 2010

(54) SHUTTER MODULE FOR USE IN IMAGE SENSOR EMPLOYING LINE SCAN AND METHOD FOR CONTROLLING THE SAME

(76) Inventors: Hyung-Suk You, 1 Hyangjeong-dong, Heungduk-gu, Cheongju-si, Chungcheongbuk-do 361-725 (KR); Seong-Cheol Byun, 1 Hyangjeong-dong, Heungduk-gu, Cheongju-si, Chungcheongbuk-do 361-725 (KR)

(*) Notice: Subject to any disclaimer, the term of this patent is extended or adjusted under 35 U.S.C. 154(b) by 888 days.

(21) Appl. No.: 11/222,524

(22) Filed: Sep. 8, 2005

(65) Prior Publication Data
US 2006/0050172 A1 Mar. 9, 2006

(30) Foreign Application Priority Data
Sep. 9, 2004 (KR) .................. 10-2004-0072056

(51) Int. Cl.
H04N 5/238 (2006.01)
H04N 3/14 (2006.01)
H04N 5/335 (2006.01)
(52) U.S. Cl. .................... 348/363; 348/296
(58) Field of Classification Search ............. 348/296, 348/362, 367; 396/246, 247, 252
See application file for complete search history.

(56) References Cited

U.S. PATENT DOCUMENTS

| | | | | |
|---|---|---|---|---|
| 2002/0093492 A1* | 7/2002 | Baron | ................ | 345/173 |
| 2003/0007088 A1* | 1/2003 | Rantanen et al. | ............ | 348/371 |
| 2003/0122946 A1* | 7/2003 | Nishino et al. | .............. | 348/297 |
| 2004/0051790 A1* | 3/2004 | Tamaru et al. | ........... | 348/223.1 |
| 2004/0165103 A1* | 8/2004 | Hashimoto et al. | .......... | 348/372 |
| 2004/0223075 A1* | 11/2004 | Furlan et al. | ................. | 348/363 |

FOREIGN PATENT DOCUMENTS

| | | |
|---|---|---|
| JP | 11-234574 | 8/1999 |
| JP | 2000-295535 | 10/2000 |
| JP | 2000-350222 | 12/2000 |
| JP | 2002-064752 | 2/2002 |
| JP | 2003-264743 | 9/2003 |

\* cited by examiner

*Primary Examiner*—Sinh Tran
*Assistant Examiner*—Albert H Cutler
(74) *Attorney, Agent, or Firm*—McAndrews, Held & Malloy, Ltd.

(57) ABSTRACT

An image sensor shutter module for use in an image sensor outputting image data with scanning line by line and a method for controlling the same are provided. The method for controlling a shutter for use in an image sensor includes: opening electronic shutters for every imaging line; opening mechanical shutter after all of the electronic shutters of every imaging line are opened; closing the mechanical shutter after a predetermined exposure time passes; and sequentially carrying out reading line image data of every imaging line with respect to each imaging line.

20 Claims, 4 Drawing Sheets

SHUTTER MODULE FOR USE IN IMAGE SENSOR EMPLOYING LINE SCAN AND METHOD FOR CONTROLLING THE SAME

FIELD OF THE INVENTION

The present invention relates to an image sensor shutter module for use in an image sensor outputting image data with scanning line by line and a method for controlling the same; and more particularly, to a shutter module for use in a complementary metal oxide semiconductor (CMOS) image sensor.

DESCRIPTION OF RELATED ARTS

Since a complementary metal oxide semiconductor (CMOS) image sensor processes image data in a line scan type, a time for driving the CMOS image sensor to take images should be differently applied for every line.

Figure 1:
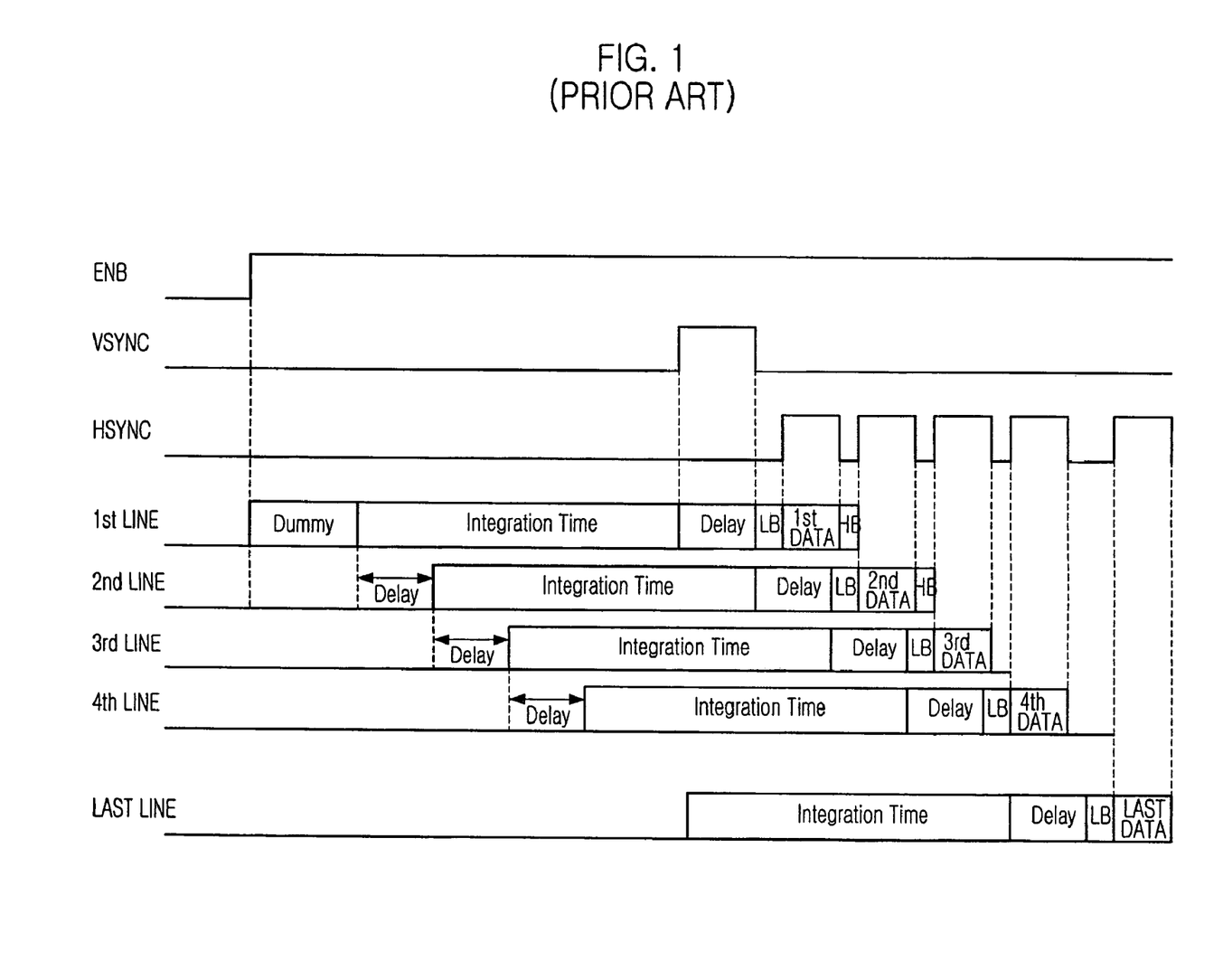
FIG. 1 is a timing diagram illustrating signals controlling a conventional image sensor shutter.

FIG. 1 is a timing diagram illustrating signals controlling a conventional image sensor shutter.

In case of using the conventional image sensor shutter, electronic shutters are equipped for every imaging line of the image sensor and time periods for opening the electronic shutters are controlled. Herein, the time periods for opening the electronic shutters are referred as an integration time.

That is, as shown in FIG. 1, starting points and ending points of the integration time are delayed by a predetermined short time for every imaging line and a length of the integration time for every imaging line is identically controlled.

Theoretically, it is possible to obtain image frames with uniform qualities through the line scan type using the aforementioned electronic shutters. However, in reality, a number of problems are generated as follows.

The electronic shutters for every imaging line are sequentially activated based on a characteristic of the line scan type. However, since the starting points and the ending points of the integration time, i.e., the exposure time, are different for each imaging line, images taken at fast moving substances look like spread.

Accordingly, there is a problem that the images look stretched.

In case of using an image sensor with less than 30 million pixels, the number of the imaging line is not large, thereby occurring a small time difference between a first imaging line and a last imaging line. Thus, a distortion in the images is not serious. However, in case of using an image sensor with more than 200 million pixels, the number of the imaging line is large, thereby occurring a big time difference between a first imaging line and a last imaging line. Thus, the distortion of the images becomes very serious.

In order to improve a quality of the image, it is preferable to use a mechanical shutter; however, the mechanical shutter cannot be directly applied to the image sensor using the line scan type.

SUMMARY OF THE INVENTION

It is, therefore, an object of the present invention to provide a method for controlling a shutter capable of making every imaging line have a physical exposure time with an identical interval.

Furthermore, it is another object of the present invention to provide a method for controlling a shutter using a mechanical shutter.

Furthermore, it is further object of the present invention to provide a method for controlling a shutter capable of obtaining an image with a high quality and removing a bending noise by using an image sensor with a line scan type.

In accordance with an aspect of the present invention, there is provided a method for controlling a shutter for use in an image sensor, including: a) opening electronic shutters for every imaging line; b) opening a mechanical shutter after all of the electronic shutters of every imaging line are opened; c) closing the mechanical shutter after a predetermined exposure time passes; and d) sequentially carrying out reading line image data of every imaging line with respect to each imaging line.

In accordance with another aspect of the present invention, there is provided an image sensor shutter module, including: an image sensor provided with a plurality of electronic shutters for every imaging line to output an image data with scanning line by line; a mechanical shutter for physically blocking a light to the image sensor; and a shutter controller serving roles in determining an exposure time of the mechanical shutter according to an internal establishment or an external command, exposure points of the mechanical shutter as points after all of the electronic shutters of the image sensor are turned on, and turn-off points of the electronic shutters as points after the mechanical shutter is blocked.

BRIEF DESCRIPTION OF THE DRAWINGS

The above and other objects and features of the present invention will become better understood with respect to the following description of the specific embodiments given in conjunction with the accompanying drawings, in which.

DETAILED DESCRIPTION OF THE INVENTION

Hereinafter, detailed descriptions on specific embodiments of the present invention will be provided with reference to the accompanying drawings.

Figure 2:
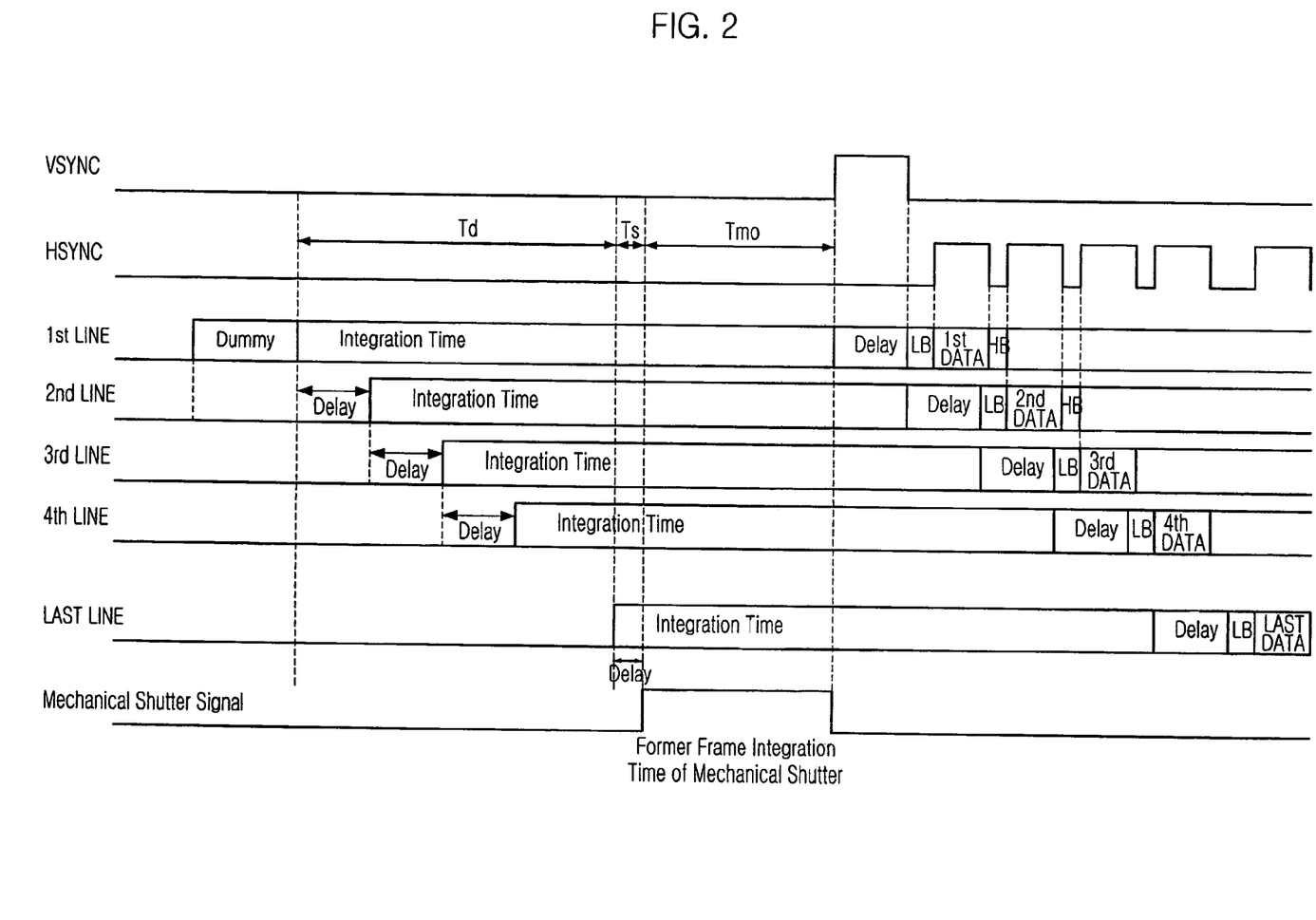
FIG. 2 is a timing diagram illustrating signals controlling an image sensor shutter in accordance with an embodiment of the present invention.
Figure 3:
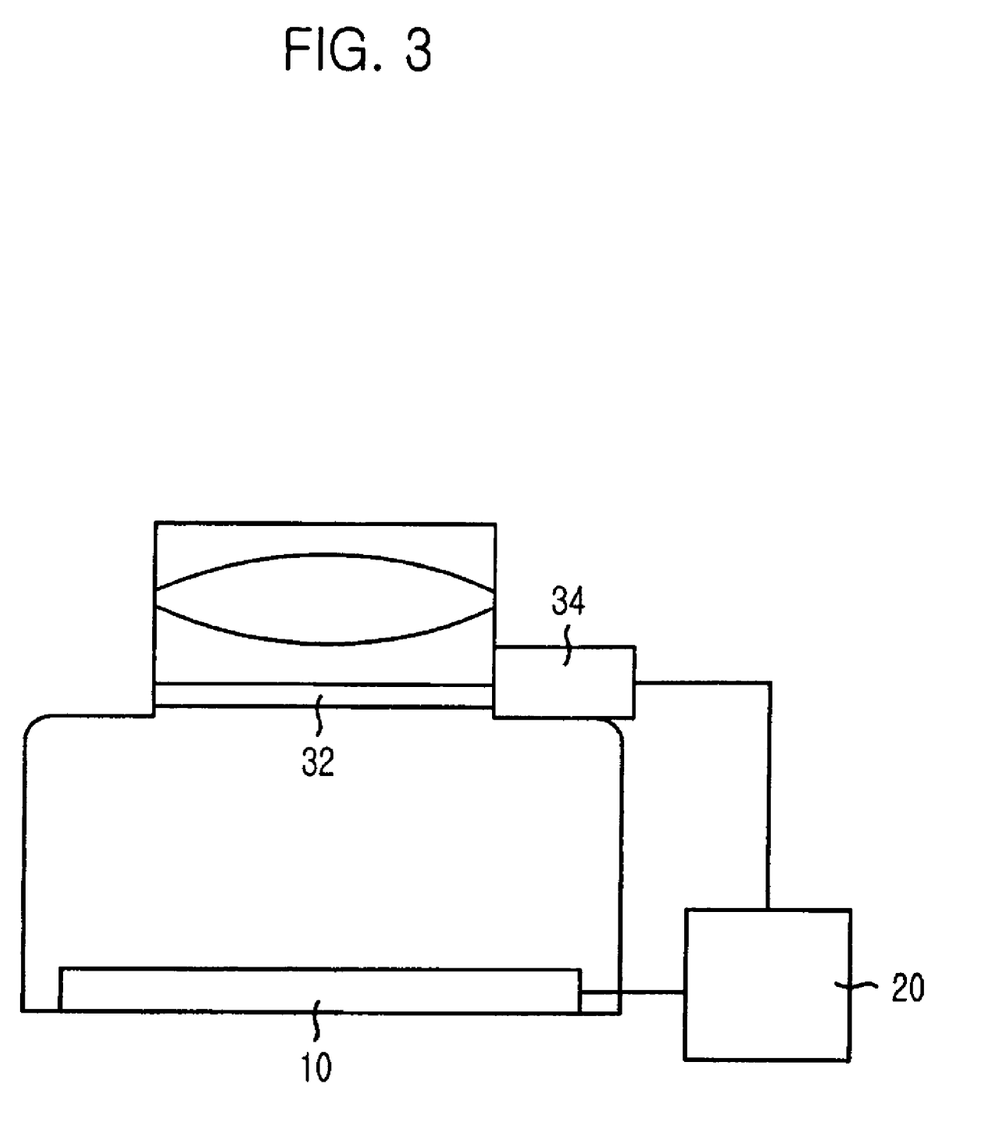
FIG. 3 is a cross-sectional view illustrating a shutter module in accordance with an embodiment of the present invention.
Figure 4:
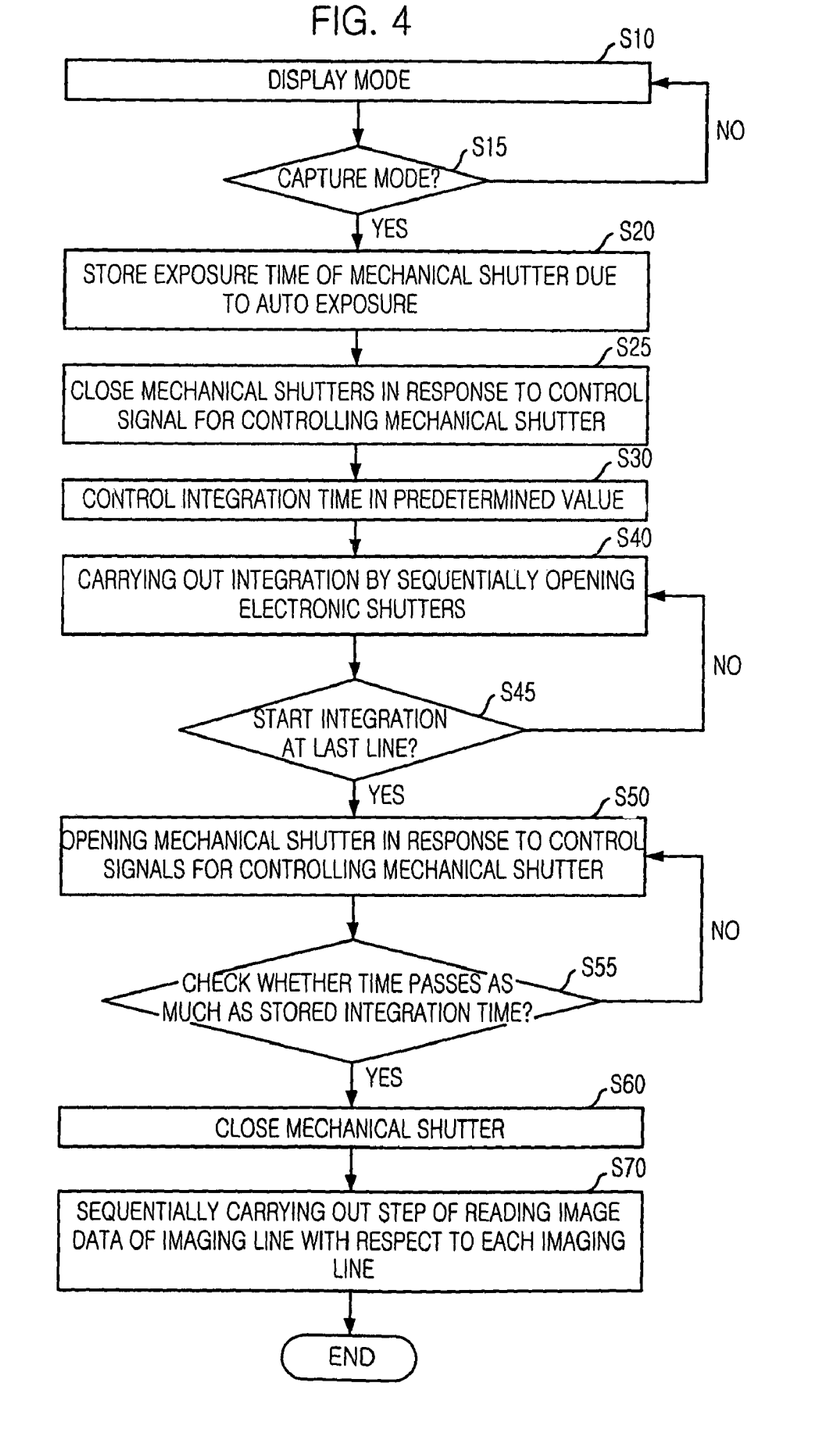
FIG. 4 is a flowchart illustrating an exposing step by a mechanical shutter in steps of controlling an image sensor shutter in accordance with an embodiment of the present invention.

FIG. 2 is a timing diagram illustrating signals controlling an image sensor shutter in accordance with an embodiment of the present invention. With reference to FIG. 2, FIGS. 3 and 4 will be explained in detail hereinafter.

FIG. 3 is a cross-sectional view illustrating a shutter module in accordance with an embodiment of the present invention.

As shown in FIG. 3, the image sensor shutter module in accordance with an embodiment of the present invention includes an image sensor 10 with electronic shutters (not shown) for every imaging line; a mechanical shutter; and a shutter controller 20. The image sensor 10 serves a role in outputting image data by using a line scan technology. The mechanical shutter serves a role in physically blocking a supply of the light to the image sensor. The shutter controller 20 determines an exposure time of the mechanical shutter according to an internal establishment or an outer order; an exposure point of the mechanical shutter after all the electronic shutters of the image sensor are turned on; and an integration time of the electronic shutters including the exposure time of the mechanical shutter.

The conventional complementary metal oxide semiconductor (CMOS) image sensor with the line scan type only uses the electronic shutters but not the mechanical shutter. However, the image sensor module in accordance with the present invention uses the CMOS image sensor with the line scan type and the mechanical shutter. In accordance with the specific embodiment of the present invention, the CMOS image sensor generates a mechanical shutter signal. An application of the line scan type to the mechanical shutter is carried out in the shutter controller 20.

The shutter controller 20 controls the mechanical shutter by using the mechanical shutter signal from the internal establishment of the CMOS image sensor. A light receiving time established by an automatic light receiving control function is applied as the exposure time of the mechanical shutter. The shutter controller 20 opens the mechanical shutter after the electronic shutters are turned on. Afterwards, the mechanical shutter is closed and then, the electronic shutters are turned off. That is, there is a relationship that the exposure time is included in the integration time.

The mechanical shutter includes a blocking member 32 for blocking a light from impinging onto the image sensor 10 and a driving member 34 for controlling the blocking member 32. The driving member 34 is controlled by the shutter controller 20.

FIG. 4 illustrates a flow until the mechanical shutter is closed to make every imaging line have the identical integration times in accordance with the specific embodiment of the present invention.

Referring to FIG. 4, the mechanical shutter is opened after all the electronic shutters are turned on and the electronic shutters are sequentially turned off after the mechanical shutter is closed.

A method for controlling the shutter in accordance with an embodiment of the present invention will be explained as follows.

A camera in accordance with an embodiment of the present invention carries out an image capturing operation according to steps S20 to S70. First, at step S20, an exposure time of the mechanical shutter due to an auto exposure (AE) in an image signal processor of the CMOS image sensor is stored. The stored exposure time is used as an exposure time of the mechanical shutter during a subsequent capturing operation.

In cases where users first capture images by pushing the shutter at a display mode, an integration time of the electronic shutters at a previous display mode is set as the exposure time, i.e., the period during which the mechanical shutter is opened. That is, for an automatic control type, a brightness of each frame is figured out at the display mode, thereby controlling the integration time of the electronic shutters in real time. The present invention uses this integration time in the image signal processor of the CMOS image sensor as the exposure time of the mechanical shutter.

For devices capable of performing a successive recording, an exposure time is set by the above described method in case of capturing the first image during continuously taking the images and the exposure time used for capturing the previous image is just used as an exposure time for capturing the present image in case of capturing the continuous images.

The above described method for setting the exposure time is applied to a simple structure such as a cellular phone camera. In case of a complex digital camera, it is possible to take images at a capture mode without setting the display mode. At this time, the digital camera is required to include an exposure time calculation module for directly calculating the best exposure time from additional light sensor data. Surely, in case of including the exposure time calculation module, the exposure time calculated at step S20 is set as a time that the exposure time calculation module designates.

Next, at step S25, signals controlling the mechanical shutter is controlled, thereby closing the mechanical shutter.

At step S30, an integration time indicating a period that the electronic shutters are turned on for every imaging line is set. In order to make image data for every imaging line have uniform properties, it is preferable to make the exposure time and the integration time have the identical values. Based on the property of the line scan type, ending points of the integration time for every imaging line are sequentially different. In case of applying the identical integration time to every imaging line, starting points of the integration are also sequentially different. Accordingly, a turn-on delay time exists from the starting point of the integration time at the first line to the starting point of the integration time at the last line. As shown in FIG. 2, the integration time applied to every imaging line includes the exposure time (Tmo) and the turn-on delay time (Td). Herein, a stabilizing delay time (Ts) taken until pixels are stabilized right after the electronic shutters are turned on is also added to the sum of the exposure time (Tmo) and the turn-on delay time (Td). Thus, the integration time of the electronic shutters to be finally applied is determined.

Next, at step S40 the electronic shutters for every imaging line are sequentially opened, thereby carrying out the integration. The electronic shutter at the first imaging line, i.e., the top line, is first turned on and then, remaining electronic shutters are sequentially turned on at an interval of a predetermined delay time. Accordingly, all the electronic shutters up to the last imaging line, i.e., the bottom line, are turned on. Each of the electronic shutters turned on can be produced to count the identical integration. However, it is preferable for the electronic shutters to use points that the mechanical shutter is closed, instead of additionally counting the identical integration time.

Also, at step S40 it is possible to produce the electronic shutters to be simultaneously turned on for every imaging line. Photoresist data values are proportional to the exposure time. Accordingly, the above operation reducing sections that the electronic shutters are turned on is preferable. However, at the present, most CMOS image sensor sequentially turns on the electronic shutters for every imaging line. Accordingly, there are a lot of portions to be changed during applying the above operation to the most CMOS image sensor.

Next, after the electronic shutter at the last imaging line is opened at step S45, the mechanical shutter is also opened at step S50. That is, if all of the electronic shutters are turned on, the mechanical shutter is opened. Then at step S55, the set exposure time is counted to check whether time passes as much as the above set exposure time. If the time passes as much as the above exposure time, the mechanical shutter is closed at step S60.

After the mechanical shutter is closed, the electronic shutters for every imaging line are sequentially turned off according to the order that the electronic shutters are sequentially turned on. Then, a process for reading the image data, i.e., the line scan, is carried out at step S70. When turning off each of the electronic shutters, a delay time identical with the predetermined delay time applied when the electronic shutters are turned on at step S40 can be used.

Vertical synchronization (VSYNC) signals indicating a point that the image data forming a frame are transferred are generated at a point the electronic shutter at the first imaging line is turned off. It is preferable to delay to transfer the image data of the first imaging line in sections where the VSYNC signals are activated. Furthermore, it is possible to transfer the image data of every imaging line in sections where horizontal synchronization (HSYNC) signals for every imaging line are activated.

As shown in FIG. 2, every imaging line has the integration time with the identical length. At the identical exposure time, all the pixels are exposed. Thus, image information for every imaging line is collected at the identical point. Although each imaging line has different exposure time in sections where the electronic shutters are turned on as the mechanical shutter is closed, the difference in the above sections does not affect the quality of the image.

The above description exemplifies a case in which the CMOS image sensor outputs images an imaging line by an imaging line. However, as resolution of the CMOS image sensor has increased, there has been a problem in a transferring speed to output the images through only one channel. Accordingly, the simultaneous transferring of the images through two channels by forming outputting channels in top and bottom portions of the image sensor is widely used. For an image sensor with higher resolution, it is possible to carry out a parallel transfer of the images through a number of channels.

In case of transferring the images trough more than one channel, it is possible to identically use the present invention. Merely, the imaging lines that the integration times are overlapped with each other exist as shown in FIG. 2 and the standard of the turn-on delay time required for calculating the integration time just gets different.

If a method for controlling the shutter in accordance with an embodiment of the present invention is used, it is possible to apply the mechanical shutter to the image sensor with the line scan type. The use of the mechanical shutter provides effects of improving a quality of the images and removing a bending noise.

The present application contains subject matter related to the Korean patent application No. KR 2004-0072056, filed in the Korean Patent Office on Sep. 9, 2004, the entire contents of which being incorporated herein by reference.

While the present invention has been described with respect to certain specific embodiments, it will be apparent to those skilled in the art that various changes and modifications may be made without departing from the spirit and scope of the invention as defined in the following claims.

What is claimed is:

1. A method for controlling a shutter for use in an image sensor, the method comprising:
   sequentially opening electronic shutters for every imaging line;
   opening a mechanical shutter after all of the electronic shutters of every imaging line are opened and after a stabilizing delay time occurs to allow pixels to stabilize after the electronic shutters are opened;
   closing the mechanical shutter after a predetermined exposure time passes; and
   sequentially carrying out reading line image data of every imaging line;
   wherein an integration time of the electronic shutters is the sum of (1) a turn-on delay time extending from an opening of an electronic shutter at a first imaging line until an opening of an electronic shutter at a last imaging line, (2) the stabilizing delay time, and (3) the predetermined exposure time of the mechanical shutter;
   wherein the turn-on delay time is a sum of intervals between openings of successive electronic shutters during the sequential opening of the electronic shutters of each of the imaging lines; and
   wherein a rate of said sequentially carrying out reading line image data is identical to a rate of said sequentially opening electronic shutters.

2. The method of claim 1, wherein the intervals are predetermined.

3. The method of claim 1, further comprising sequentially turning off the electronic shutters for each imaging line in the order that the electronic shutters are opened.

4. The method of claim 1, further comprising setting the predetermined exposure time of the mechanical shutter equal to an integration time at a previous display mode less the sum of delay times taken for sequentially opening the electronic shutters of each of the imaging lines at the previous display mode.

5. The method of claim 4, further comprising setting the integration time to be applied to each imaging line to be longer than the predetermined exposure time of the mechanical shutter prior to said sequentially opening electronic shutters.

6. The method of claim 1, further comprising setting the predetermined exposure time of the mechanical shutter equal to an exposure time of the mechanical shutter used to capture a previous image.

7. The method of claim 6, further comprising setting the integration time to be applied to each imaging line to be longer than the predetermined exposure time of the mechanical shutter prior to said sequentially opening electronic shutters.

8. The method of claim 1, further comprising setting an exposure time set by an external command as the predetermined exposure time of the mechanical shutter prior to said sequential opening electronic shutters.

9. The method of claim 8, further comprising setting the integration time to be applied to each imaging line to be longer than the predetermined exposure time of the mechanical shutter prior to said sequentially opening electronic shutters.

10. The method of claim 1, further comprising closing the mechanical shutter as a display mode is changed to a capture mode prior to said sequentially opening electronic shutters.

11. The method of claim 10, wherein after the mechanical shutter is closed as the display mode is changed to the capture mode, the image sensor is reset.

12. An image sensor shutter module, comprising:
   an image sensor having an electronic shutter for each of a plurality of imaging lines configured to output image data with scanning line by line;
   a mechanical shutter configured to physically block a light to the image sensor; and
   a mechanical shutter controller configured to control an exposure time of the mechanical shutter according to one of an internal establishment or an external command;
   wherein the image sensor shutter module is configured such that:
      an integration time of the electronic shutters is the sum of (1) a turn-on delay time extending from an opening of an electronic shutter at a first imaging line until an opening of an electronic shutter at a last imaging line, (2) a stabilizing delay time extending from the opening of the electronic shutter at the last imaging line until pixels of the last imaging line are stabilized, and (3) the exposure time of the mechanical shutter, wherein the exposure time occurs after the stabilizing delay time;

the turn-on delay time is a sum of intervals between openings of successive electronic shutters during a sequential opening of the electronic shutters of each of the imaging lines; and a rate of sequentially carrying out reading line image data of every imaging line is identical to a rate of the sequential opening of the electronic shutters.

13. The image sensor shutter module of claim 12, wherein the mechanical shutter comprises a blocking member configured to block the light to the image sensor and a driving member configured to drive the blocking member according to controlling signals inputted from the shutter controller.

14. The image sensor shutter module of claim 13, wherein the exposure time of the mechanical shutter is set as an integration time at a previous display mode.

15. The image sensor shutter module of claim 13, wherein the exposure time of the mechanical shutter is set as an exposure time of the mechanical shutter applied for carrying out an image capture.

16. The image sensor shutter module of claim 13, wherein the exposure time of the mechanical shutter is set as an exposure time set by an external command.

17. The image sensor shutter module of claim 12, wherein the exposure time of the mechanical shutter is set as an integration time at a previous display mode.

18. The image sensor shutter module of claim 12, wherein the exposure time of the mechanical shutter is set as an integration time at a previous display time.

19. The method image sensor shutter module of claim 12, wherein the exposure time of the mechanical shutter is set as an exposure time of the mechanical shutter applied for carrying out an image capture.

20. The image sensor shutter module of claim 12, wherein the exposure time of the mechanical shutter is set as an exposure time set by an external command.

* * * * *

UNITED STATES PATENT AND TRADEMARK OFFICE
CERTIFICATE OF CORRECTION

PATENT NO. : 7,760,265 B2 Page 1 of 1
APPLICATION NO. : 11/222524
DATED : July 20, 2010
INVENTOR(S) : You et al.

It is certified that error appears in the above-identified patent and that said Letters Patent is hereby corrected as shown below:

In claim 19, line 11, please delete "method" following "The".

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,760,265 B2
APPLICATION NO. : 11/222524
DATED : July 20, 2010
INVENTOR(S) : You et al.

It is certified that error appears in the above-identified patent and that said Letters Patent is hereby corrected as shown below:

In claim 19, Column 8, line 11, please delete "method" following "The".

This certificate supersedes the Certificate of Correction issued November 30, 2010.

Signed and Sealed this
Twenty-fifth Day of January, 2011

David J. Kappos
*Director of the United States Patent and Trademark Office*